United States Patent
Mirani et al.

(10) Patent No.: US 9,407,554 B2
(45) Date of Patent: Aug. 2, 2016

(54) SYSTEMS AND METHODS FOR PROVIDING A MULTI-CORE ARCHITECTURE FOR AN ACCELERATION APPLIANCE

(71) Applicant: Citrix Systems, Inc., Fort Lauderdale, FL (US)

(72) Inventors: Rajiv Mirani, San Jose, CA (US); Rajiv Sinha, San Jose, CA (US); Abhishek Chauhan, San Jose, CA (US); Anil Shetty, Union City, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 197 days.

(21) Appl. No.: 13/929,985

(22) Filed: Jun. 28, 2013

(65) Prior Publication Data

US 2013/0286839 A1    Oct. 31, 2013

Related U.S. Application Data

(63) Continuation of application No. 12/766,324, filed on Apr. 23, 2010, now Pat. No. 8,503,459.

(60) Provisional application No. 61/175,733, filed on May 5, 2009.

(51) Int. Cl.
*H04L 12/28* (2006.01)
*H04L 12/803* (2013.01)
(Continued)

(52) U.S. Cl.
CPC ............ *H04L 47/125* (2013.01); *G06F 9/5005* (2013.01); *H04L 49/90* (2013.01); *H04L 67/02* (2013.01); *G06F 2209/5016* (2013.01);
(Continued)

(58) Field of Classification Search
None
See application file for complete search history.

(56) References Cited

U.S. PATENT DOCUMENTS 5,590,284 A * 12/1996 Crosetto .................. 712/29
7,284,068 B1   10/2007 Ramalho
(Continued)

FOREIGN PATENT DOCUMENTS

WO    WO-2009/073295 A1    6/2009

OTHER PUBLICATIONS

Chinese Office Action for Chinese Application No. 201080029106.4 dated Aug. 20, 2014.
(Continued)

*Primary Examiner* — Dang Ton
*Assistant Examiner* — Ronald H Davis
(74) *Attorney, Agent, or Firm* — Foley & Lardner LLP; Christopher J. McKenna; Daniel E. Rose

(57) ABSTRACT

The present solution is related to a method for distributing flows of network traffic across a plurality of packet processing engines executing on a corresponding core of a multi-core device. The method includes receiving, by a multi-core device intermediary to clients and servers, a packet of a first flow of network traffic between a client and server. The method also includes assigning, by a flow distributor of the multi-core device, the first flow of network traffic to a first core executing a packet processing engine and distributing the packet to this core. The flow distributor may distribute packets of another or second flow of traffic between another client and server to a second core executing a second packet processing engine. When a packet for the flow of traffic assigned to the first core is received, such as a third packet, the flow distributor distributes this packet to the first core.

20 Claims, 16 Drawing Sheets

(51) Int. Cl.
G06F 9/50 (2006.01)
H04L 12/861 (2013.01)
H04L 29/12 (2006.01)
H04L 29/08 (2006.01)

(52) U.S. Cl.
CPC ....... H04L29/12066 (2013.01); H04L 61/1511 (2013.01); H04L 67/14 (2013.01)

(56) References Cited

U.S. PATENT DOCUMENTS

| | | | |
|---|---|---|---|
| 7,474,647 | B2 | 1/2009 | Vanttinen |
| 7,773,510 | B2 | 8/2010 | Back et al. |
| 7,836,195 | B2 | 11/2010 | Veal et al. |
| 2004/0205250 | A1 | 10/2004 | Bain et al. |
| 2007/0025270 | A1 | 2/2007 | Sylvain |
| 2007/0070904 | A1 | 3/2007 | King et al. |
| 2007/0121662 | A1* | 5/2007 | Leech .................. 370/412 |
| 2008/0077792 | A1 | 3/2008 | Mann |
| 2008/0298230 | A1 | 12/2008 | Luft et al. |
| 2008/0298362 | A1 | 12/2008 | Ben-Dvora et al. |
| 2009/0003282 | A1 | 1/2009 | Meylan et al. |
| 2009/0063747 | A1 | 3/2009 | Bagepalli et al. |
| 2009/0285228 | A1 | 11/2009 | Bagepalli et al. |
| 2011/0064084 | A1 | 3/2011 | Tatar et al. |
| 2011/0238855 | A1 | 9/2011 | Korsunsky et al. |

OTHER PUBLICATIONS

Chinese Office Action for Chinese Application No. 201080030106.6 dated Aug. 18, 2014.
US Ex Parte Quayle Action in U.S. Appl. No. 13/190,143 DTD Aug. 23, 2013.
US Notice of Allowance in U.S. Appl. No. 13/190,143 DTD Oct. 8, 2013.
Anonymous: "Receive-Side Scaling Enhancements in Windows Server 2888" Internet Citation Nov. 5, 2008 (2008-11-85), pp. 1-18, XP882538883 [retrieved on Jul. 23, 2009] pp. 5-7.
Defense Advanced Research Projects Agency Information Sciences Institute University of Southern California 4676 Admiralty Way Mari: "Internet Protocol Darpa Internet Program Protocol Specification; rfc791.txt", 19810901, Sep. 1, 1981, XP015006773, ISSN: 0000-0003.
Defense Advanced Research Projects Agency Information Sciences Institute University of Southern California 4676 Admiralty Way Mari: "Transmission Control Protocol Darpa Internet Program Protocol Specification prepared for Information Processing Techniques Office 1400 Wilson Boulevard 22209 by ; rfc793.txt", 19810901, Sep. 1, 1981, XP015006775, ISSN: 0000-0003.
European Communication on 10717403.9 dated Dec. 15, 2011.
European Communication on 10717431.0 dated Dec. 15, 2011.
European Office Action issued Aug. 13, 2012 in European Patent Application No. 10717403.9.
European Office Action issued Aug. 13, 2012 in European Patent Application No. 10717431.0.
International Preliminary Report on Patentability on PCT/US2010/033496 dated Nov. 17, 2011.
International Preliminary Report on Patentability on PCT/US2010/033742 dated Nov. 17, 2011.
International Search Report on PCT/US2010/033496 dated Sep. 27, 2010.
International Search Report on PCT/US2010/033742 dated Sep. 27, 2010.
Notice of Allowance on U.S. Appl. No. 12/489,207 dated Apr. 29, 2011.
Notice of Allowance on U.S. Appl. No. 12/766,324 dated Jan. 4, 2013.
Office Action on U.S. Appl. No. 13/190,143 Jan. 8, 2013.
Smith M et al: "Network security using NAT and NAPT" Networks, 2002. ICON 2002. 10th IEEE International Conference on Aug. 27-38, 2002, Piscataway, NJ, USA,IEEE LNKD-DOI:10.1109/ICON.2002.1033337, Aug. 27, 2002, pp. 355-360, XP010603644 ISBN: 978-0-7803-7533-8 the whole document.
US Notice of Allowance on 099011-2033 DTD Apr. 29, 2013.
US Office Action on 099011-2033 DTD Oct. 4, 2012.
US Office Action on 099011-2033 DTD Apr. 10, 2012.
US Office Action on 099011-2811 DTD Jun. 17, 2013.
Written Opinion on PCT/US2010/033496 dated Sep. 27, 2010.
Written Opinion on PCT/US2010/033742 dated Sep. 27, 2010.
CN Office Action for Application No. 201080030106.6 dated Dec. 19, 2013 (14 pages).
First Office Action issued in Chinese Patent Application No. 201080029106.4, mailed on Mar. 18, 2014.
U.S. Appl. No. 12/766,324, filed Apr. 23, 2010.
U.S. Appl. No. 12/489,207, filed Jun. 22, 2009.
U.S. Appl. No. 13/190,143, filed Jul. 25, 2011.
EP Examination Report for EP Application No. 10717403.9 dated Mar. 3, 2015.
EP Examination Report for EP Application No. 10717431.0 dated Mar. 3, 2015.

* cited by examiner

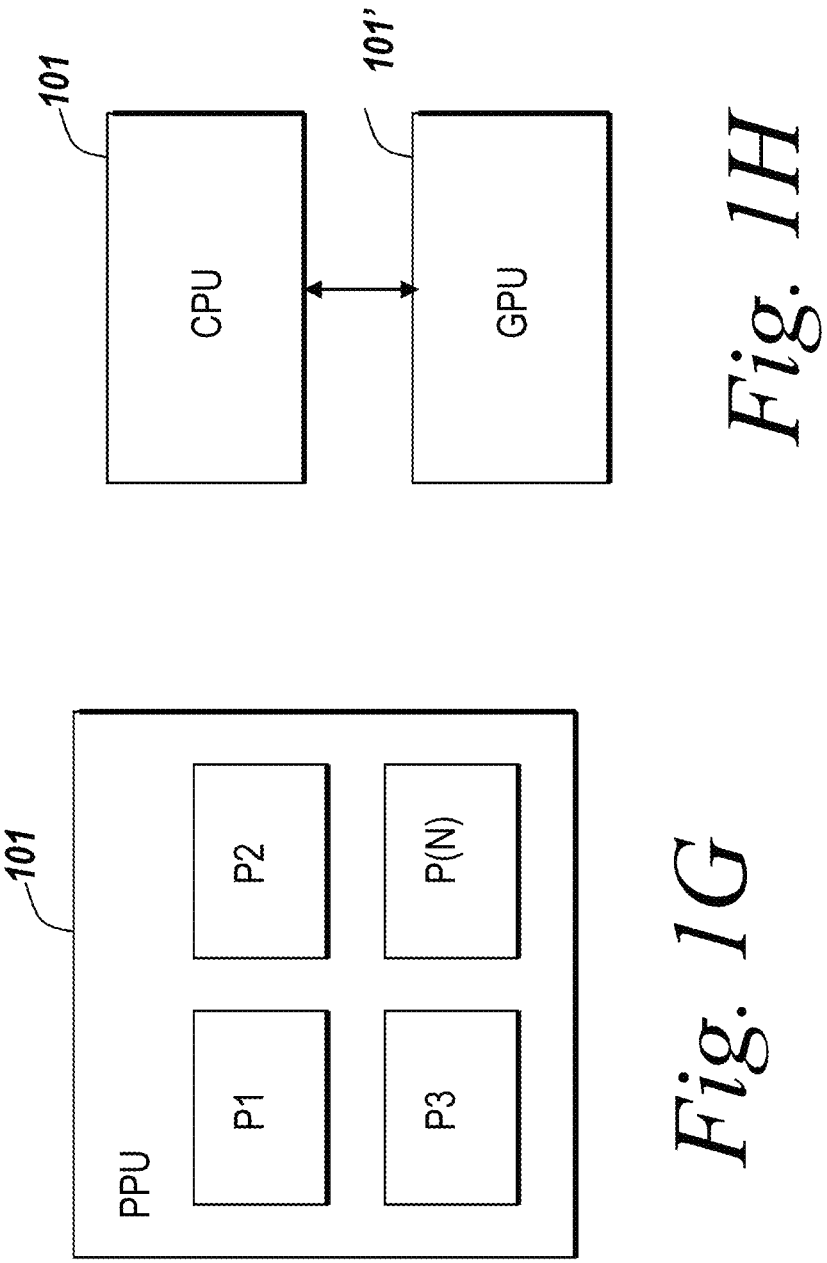

SYSTEMS AND METHODS FOR PROVIDING A MULTI-CORE ARCHITECTURE FOR AN ACCELERATION APPLIANCE

RELATED APPLICATION

This application claims priority to and is a continuation of U.S. patent application Ser. No. 12/766,324 entitled "Systems and Methods for Providing a Multi-Core Architecture for an Acceleration Appliance" and filed on Apr. 23, 2010, which claims priority to U.S. Provisional Patent Application No. 61/175,33 entitled "Systems and Methods for Providing a Multi-Core Architecture for an Acceleration Appliance", all of which are incorporated herein by reference in their entirety.

FIELD OF THE INVENTION

The present application generally relates to architectures of application delivery controllers. In particular, the present application relates to systems and methods for providing a multi-core application delivery controller.

BACKGROUND OF THE INVENTION

The web and web applications are going through a period of accelerated evolution. Web applications are moving from the non-interactive, flat, developer-controlled web pages that characterize Web 1.0 to the highly-interactive, dynamic and community-enriched web pages that represent Web 2.0. In the last two to three years, the explosive popularity of social networking sites like MySpace and Facebook, video sites like YouTube and mash-ups like Google Maps has called attention to the trends and technologies that make these highly interactive and rich media sites possible. For example, enterprise independent software vendors like SAP, Microsoft, Oracle, Intuit and others have taken notice of the possibilities of Web 2.0 technologies and have adopted the technologies to enrich the functionality and user experience of their enterprise web application offerings. Another example of an enterprise application that has incorporated a number of Web 2.0 features is Microsoft SharePoint, which is a document sharing and collaboration tool. The latest version of SharePoint 2007 provides a number of collaboration and portal features like team blogs, wikis and team calendars that can be customized on an individual basis.

However, the increased collaboration features and richness of Web 2.0 technologies comes at a cost. There are more protocols being used such as AJAX, Comet, Ruby, etc. The number of connections between clients and servers are increasing as these protocols generate more connections. These protocols initiate more requests between the client and browser, and therefore are consider more chatty. Rich internet applications are increasingly being used like Flash, Flex and Silverlight to make Web 2.0 apps more engaging and interactive Also the number of different clients using the web is increasing. In today's "always connected" world, content needs to be optimized for many types of clients (e.g. mobile (Symbian, Blackberry, Palm, Windows Mobile), IE, Firefox, Chrome, etc.)

BRIEF SUMMARY OF THE INVENTION

The present solution is directed towards systems and methods for providing a multi-core implementation of an application delivery controller (ADC). An architecture of an ADC appliance, referred to as nCore technology, allows the appliance break the single core performance barrier and to leverage the power of multi-core CPUs. With a packet engine running each core, the appliance architecture leverages the processing capacity of these packet engines and cores. In some embodiments, this provides up to a 7× increase in performance and scalability. Embodiments of the architecture provides a flow based distribution scheme for distributing network packets across cores to more evenly balance processing across the packet engines and cores.

In one aspect, the present solution is related to a method for distributing flows of network traffic across a plurality of packet processing engines executing on a corresponding core of a multi-core device. The method includes receiving, by a multi-core device intermediary to clients and servers, a packet of a first flow of network traffic between a client and server. The method also includes assigning, by a flow distributor of the multi-core device, the first flow of network traffic to a first core executing a packet processing engine and distributing the packet to this core. The flow distributor may distribute packets of another or second flow of traffic between another client and server to a second core executing a second packet processing engine. When a packet for the flow of traffic assigned to the first core is received, such as a third packet, the flow distributor distributes this packet to the first core.

In some embodiments, the method includes receiving by the flow distributor the first packet from a receive-side scaler (RSS) of the multi-core device. The flow distributor may execute on a core of the multi-core device designated as a master core. In some cases, the flow distributor is distributed across cores or executes on multiple cores.

In some embodiments, the flow distributor assigns the first flow of network traffic to the first core responsive to the first core establishing one of a session or a connection between the first server and the first client. In some embodiments, the flow distributor assigns the first flow of network traffic to the first core responsive to the first core based on response from the first server to a request of the first client. In some embodiments, the flow distributor assigns the first packet via memory shared by or allocated to the first core. In some embodiments, the flow distributor assigns the second flow of network traffic to the second core responsive to the second core establishing one of a session or a connection to the second server for the second client.

In some embodiments, the method includes receiving by the flow distributor, the third packet from the receive side scaler distributed by the RSS to a third core and redistributing the third packet to the first core. In some embodiments, any of the first, second, third or other packets may be received via any one or more network interfaces, such as a first network interface card and a second network interface card.

In some aspects, the present solution is related to a system for distributing flows of network traffic across a plurality of packet processing engines executing on a corresponding core of a multi-core device. The system comprising a network interface of a multi-core device intermediary to a plurality of clients and a plurality of servers. The network interface receives a first packet of a first flow of network traffic between a first client of the plurality of clients and a first server of a plurality of servers. The system also includes a flow distributor which assigns the first flow to a first core executing a first packet processing engine of a plurality of packet processing engine executed by the multi-core device and distributes the first packet to the first core. The flow distributor also distributes a second packet of a second flow of network traffic between a second client and a second server to a second core executing a second packet processing engine of the plurality of packet processing engines. The flow distributor determines to distribute to the first core a third packet received by the multi-core device for the first flow of network traffic.

In some embodiments of the system, the flow distributor receives network packets distributed by a receive-side scaler (RSS) of the multi-core device. The flow distributor may execute on a core of the multi-core device designated as a master core. The flow distributor may execute across a plurality of cores of the multi-core device. The flow distributor may distributes the first packet via memory shared by or allocated to the first core In some embodiments, the flow distributor assigns the first flow of network traffic to the first core responsive to the first core establishing one of a session or a connection to the first server for the first client. In some embodiments, the flow distributor assigns the first flow of network traffic to the first core based on a response from the first server to a request of the first client. In some embodiments, the flow distributor assigns the second flow of network traffic to the second core responsive to the second core establishing one of a session or a connection to the second server for the second client. In some embodiments, the flow distributor receives the third packet from the receive side scaler distributed by the RSS to a third core and redistributing the third packet to the first core. In some embodiments, the first packet is received via a first network interface of the multi-core and the third packet is received via a second network interface of the multi-core device.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 1G and 1H are block diagrams of embodiments of a computing device;

DETAILED DESCRIPTION OF THE INVENTION

A. Network and Computing Environment

Figure 1A:
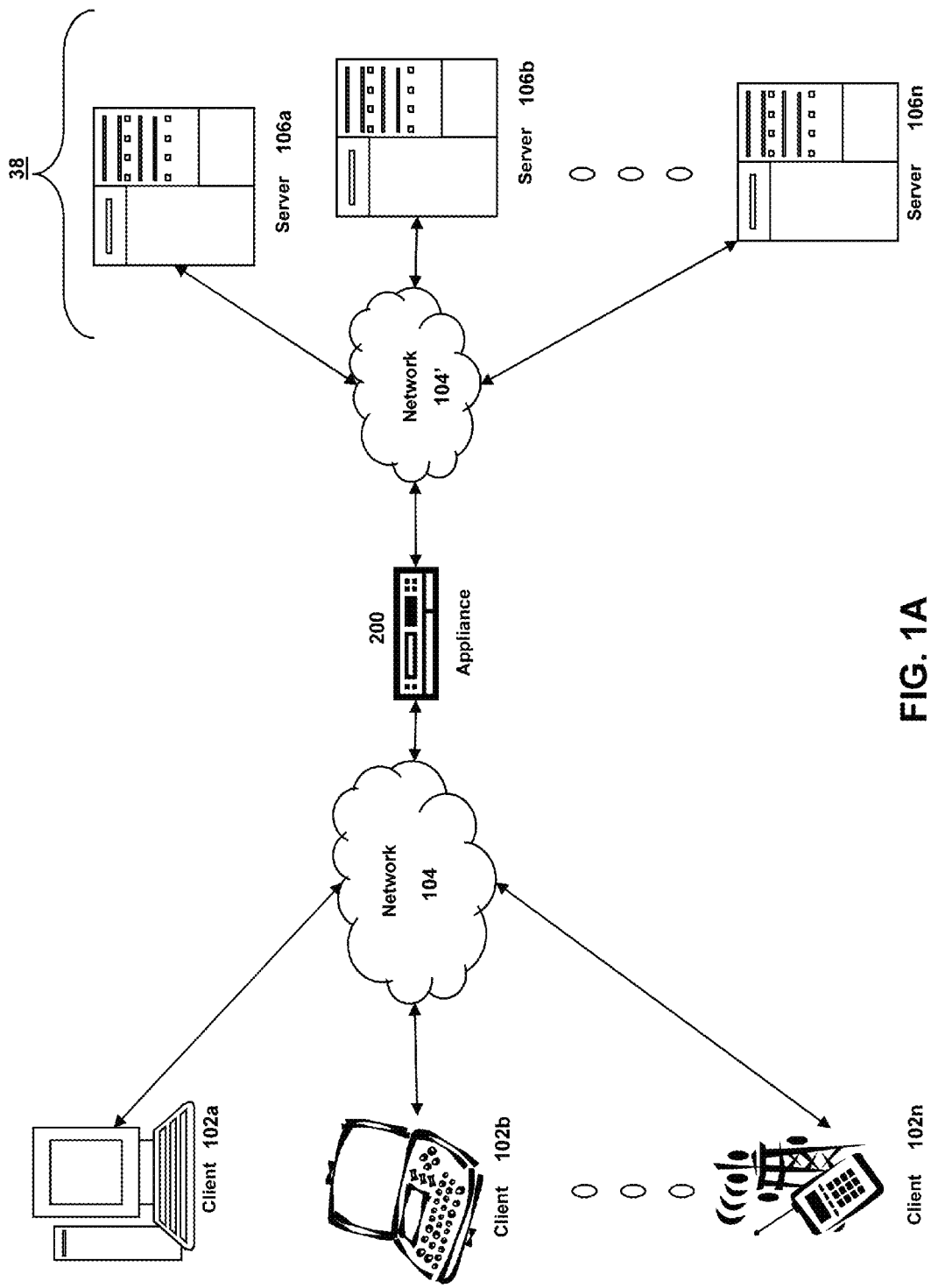
FIG. 1A and 1B are block diagrams of embodiments of a network environment for a client to access a server via one or more appliances.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
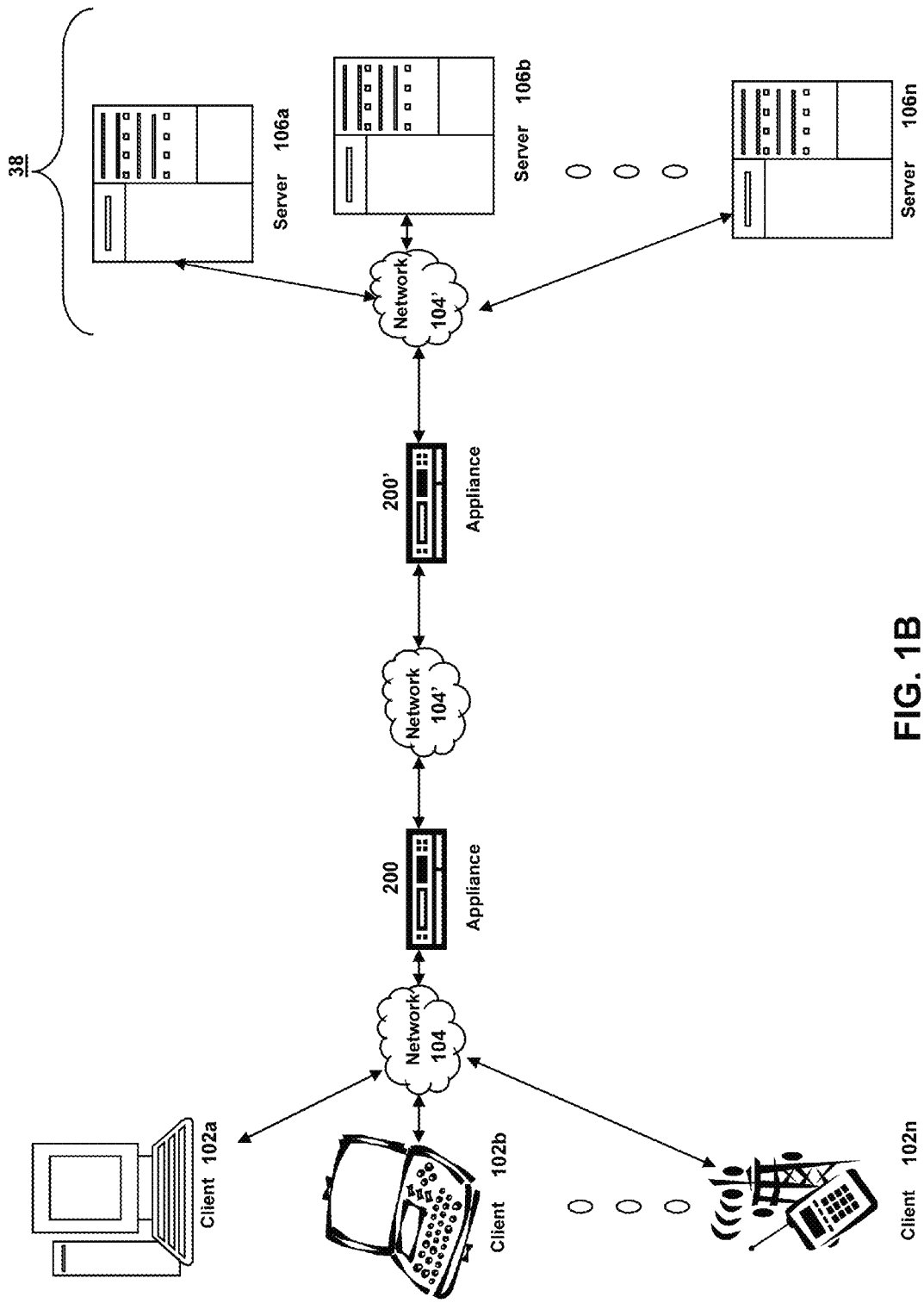
Figure 1C:
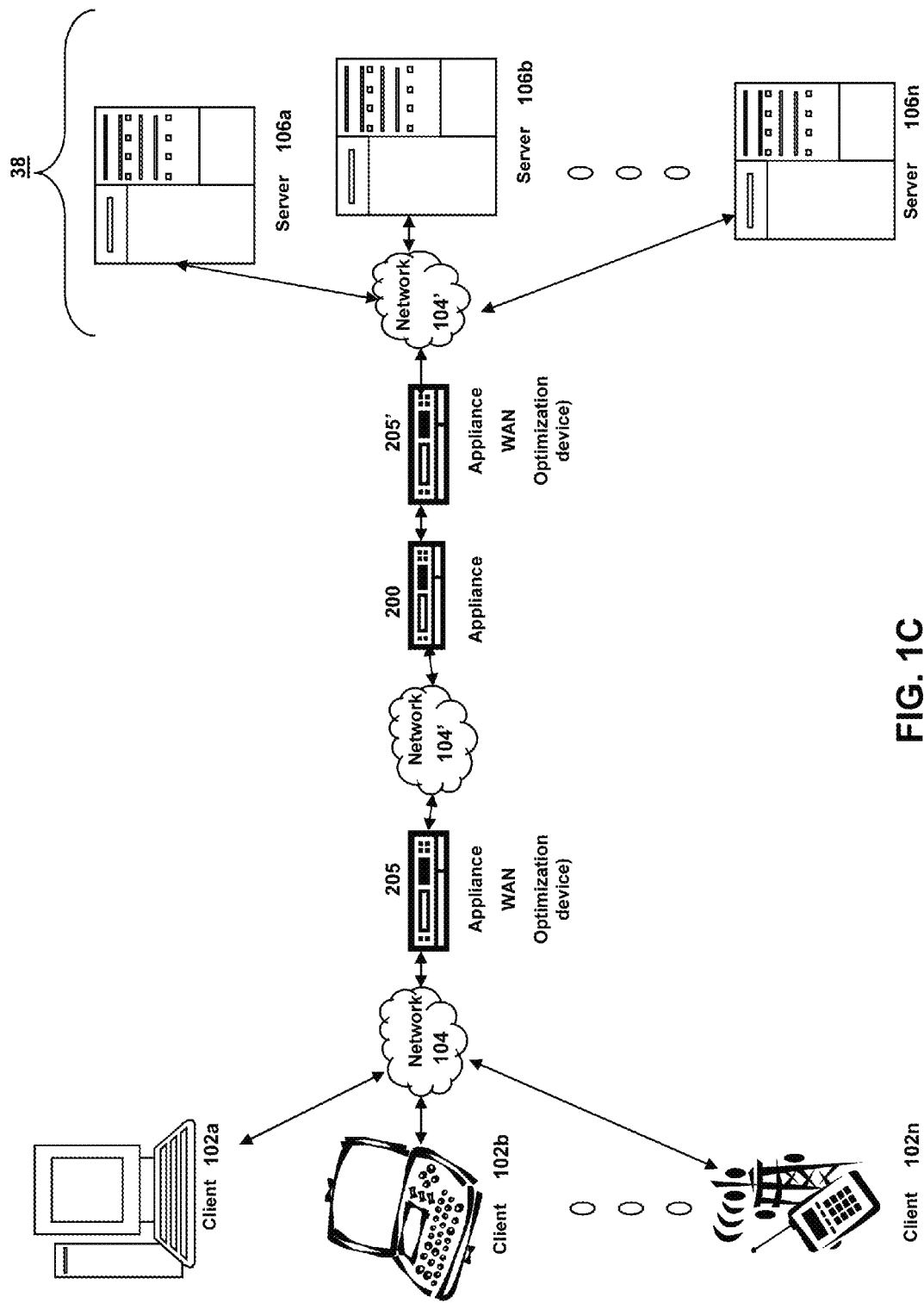
FIGS. 1C and 1D are block diagrams of embodiments of a computing device.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
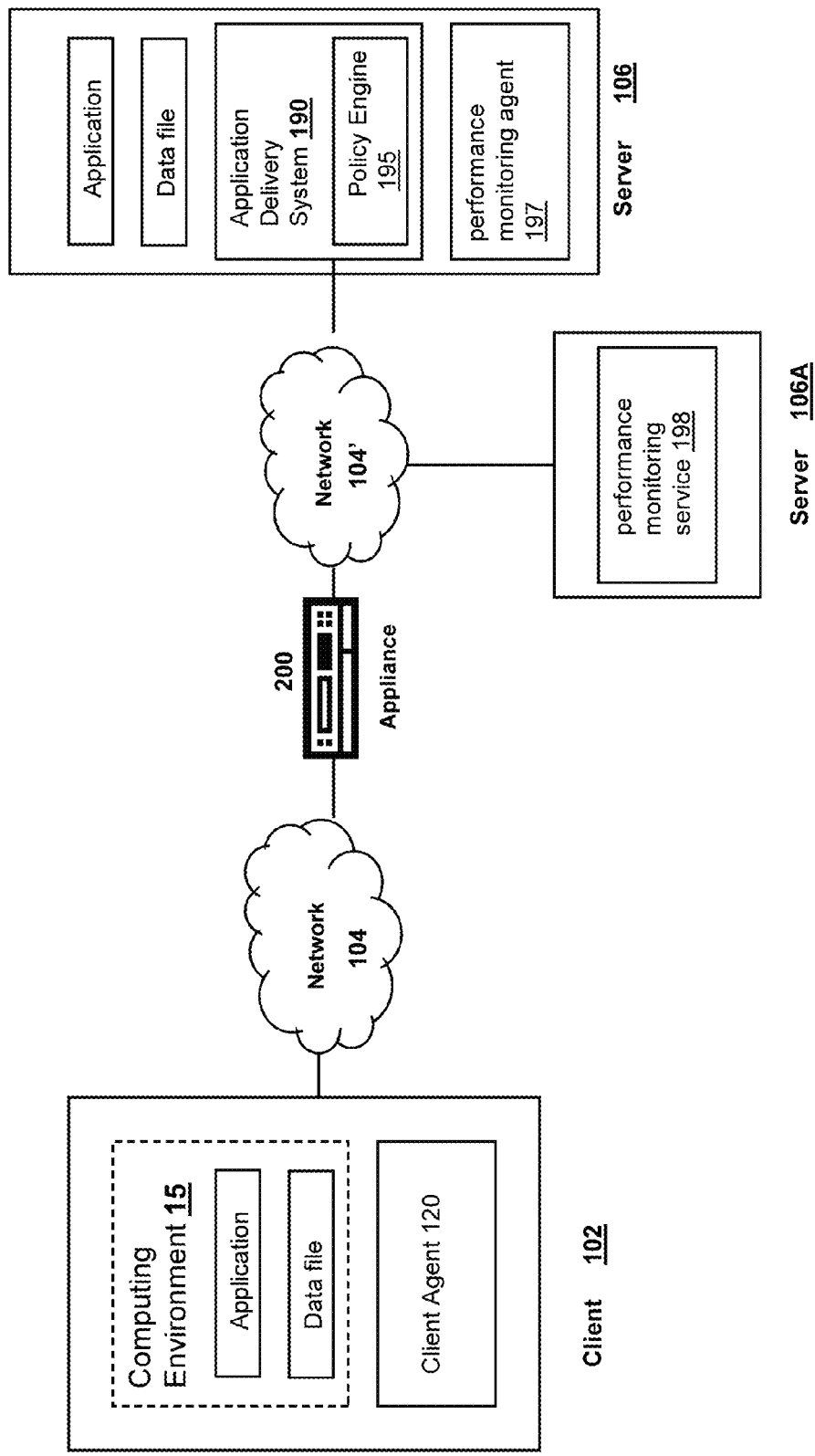

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Texas.

Figure 1E:
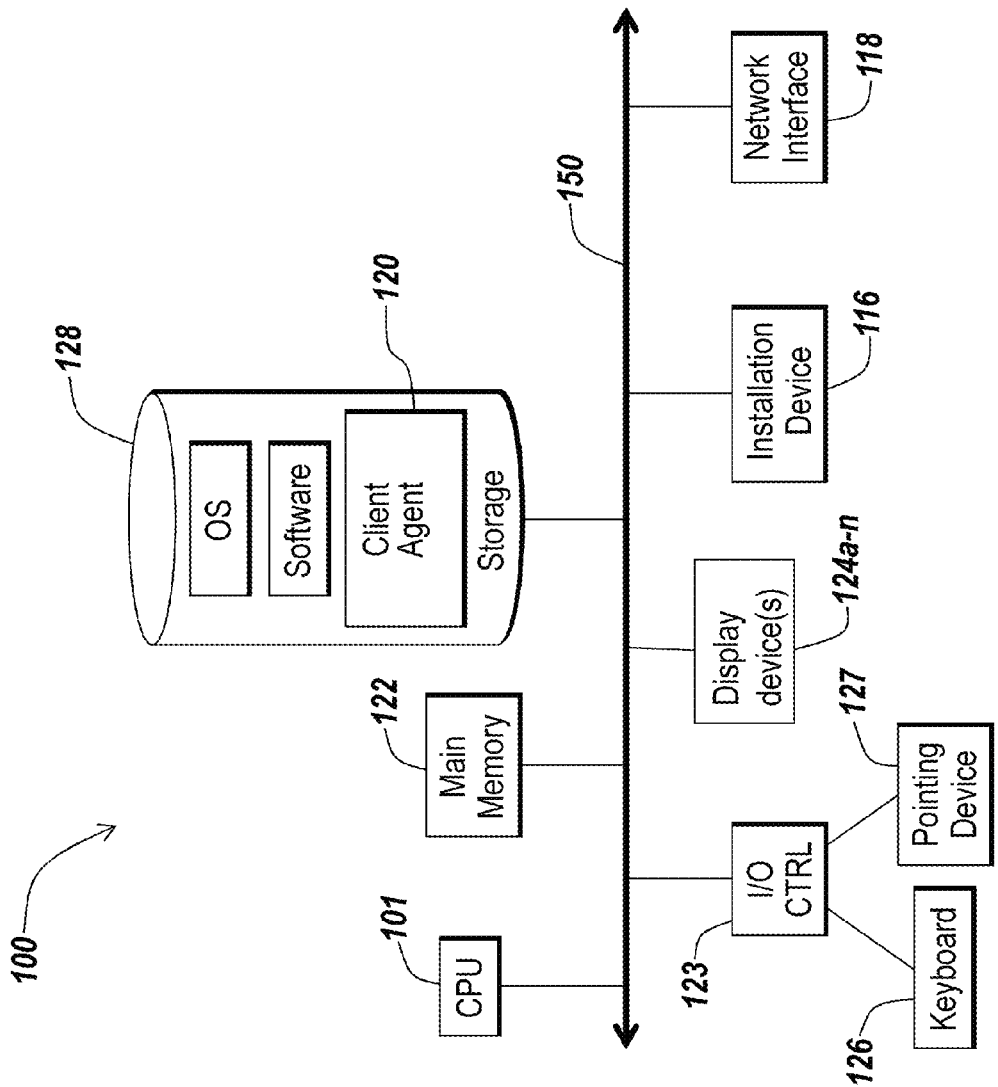
FIGS. 1E and 1F are block diagrams of embodiments of a computing device.
Figure 1F:
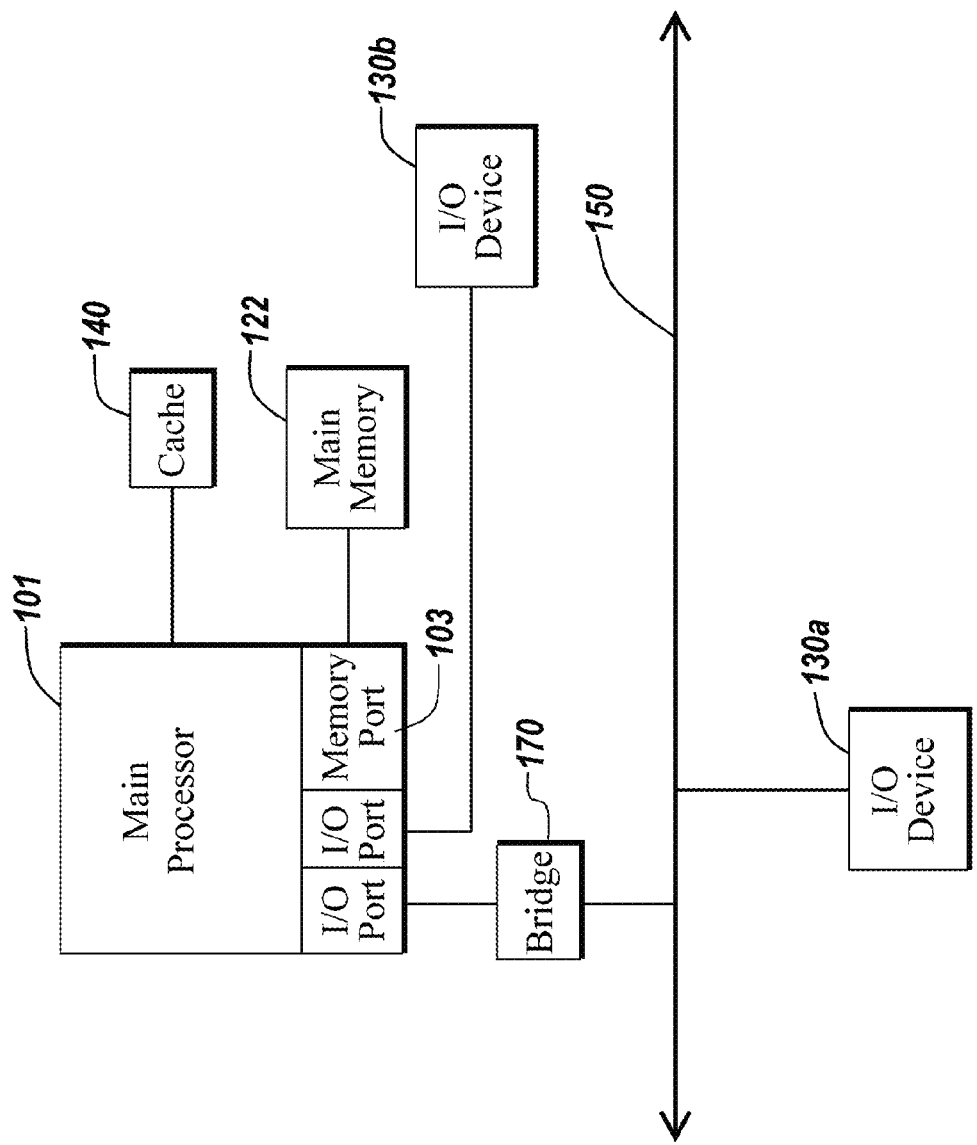

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Illinois; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.,; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
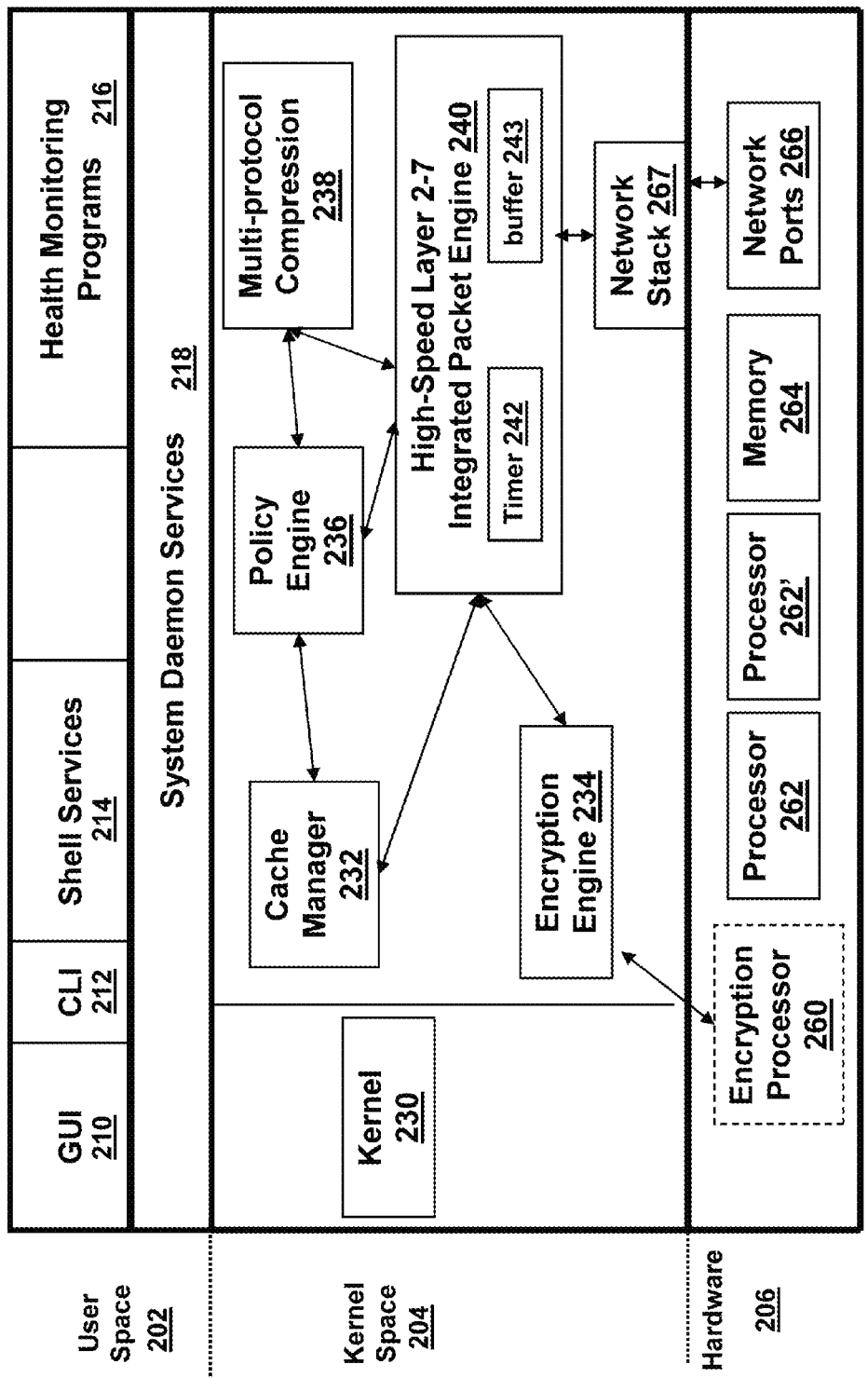
FIG. 2A is a block diagram of an embodiment of an appliance for optimizing, accelerating, load-balancing and routing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
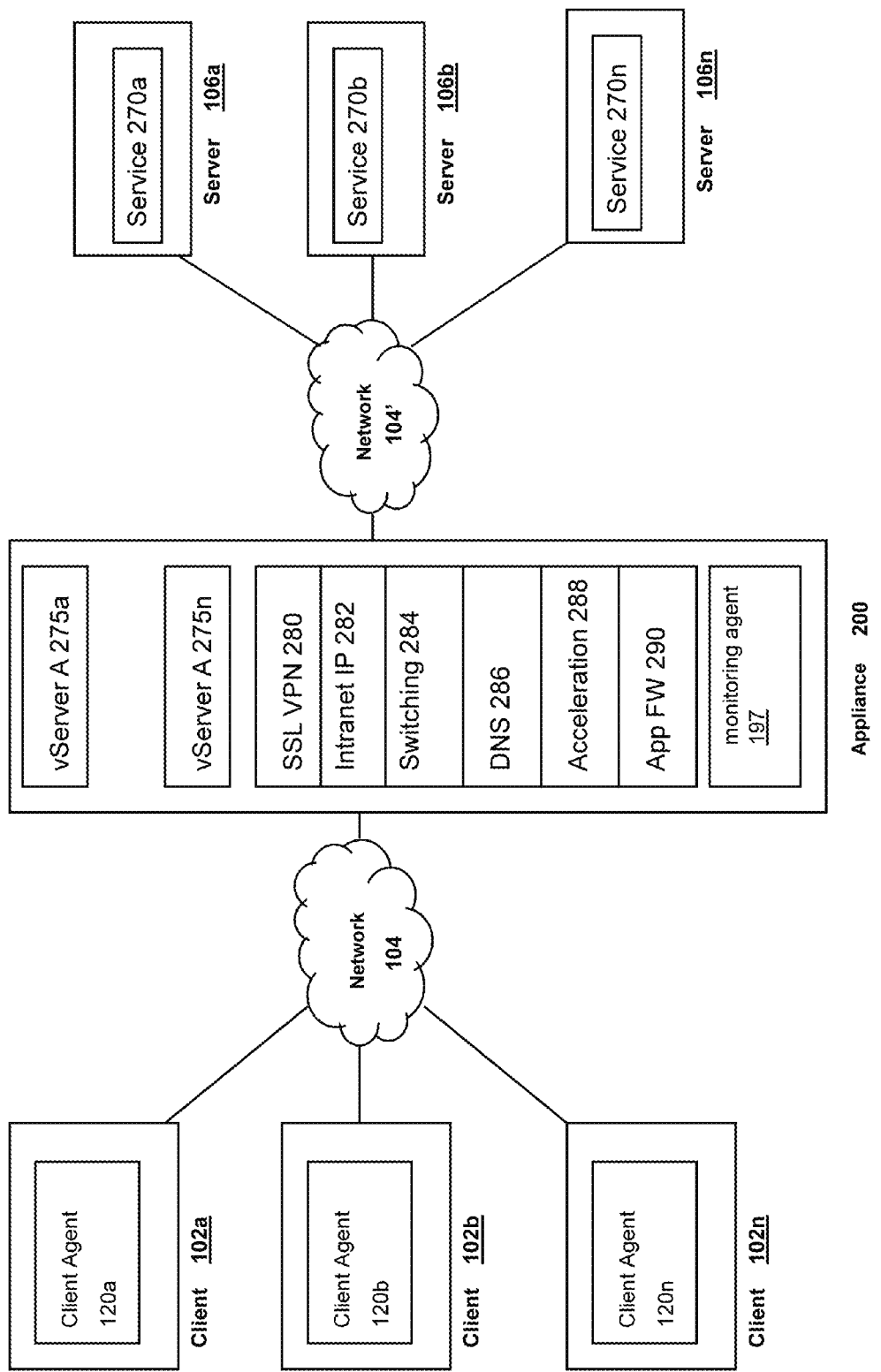
FIG. 2B is a block diagram of another embodiment of an appliance for processing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of tranport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Systems and Methods for Providing N-Core Architecture

Moore's Law appears alive and well—the number of transistors that can be placed on an integrated circuit continues to double every two years. However, CPU speed increases have reached a plateau around 3.5-4 GHz range since 2005. CPU manufacturers may not rely on CPU speed increases to gain additional performance. Some CPU manufacturers are adding additional cores to their processors to provide additional performance. Products, such as those of software and networking vendors, that rely on CPUs for performance gains may improve their performance by leveraging these multi-core CPUs. The software designed and constructed for a single CPU may be rewritten to take advantage of a multi-threaded, parallel architecture An architecture of the appliance 200, referred to as nCore technology, allows the appliance break the single core performance barrier and to leverage the power of multi-core CPUs. In the previous architecture described in connection with FIG. 2A, a single network or packet Engine is run. The nCore technology and architecture allows multiple Packet Engines to run. With a packet engine running each core, the appliance architecture leverages the processing capacity of additional cores. In some embodiments, this provides up to a 7× increase in performance and scalability.

Figure 3:
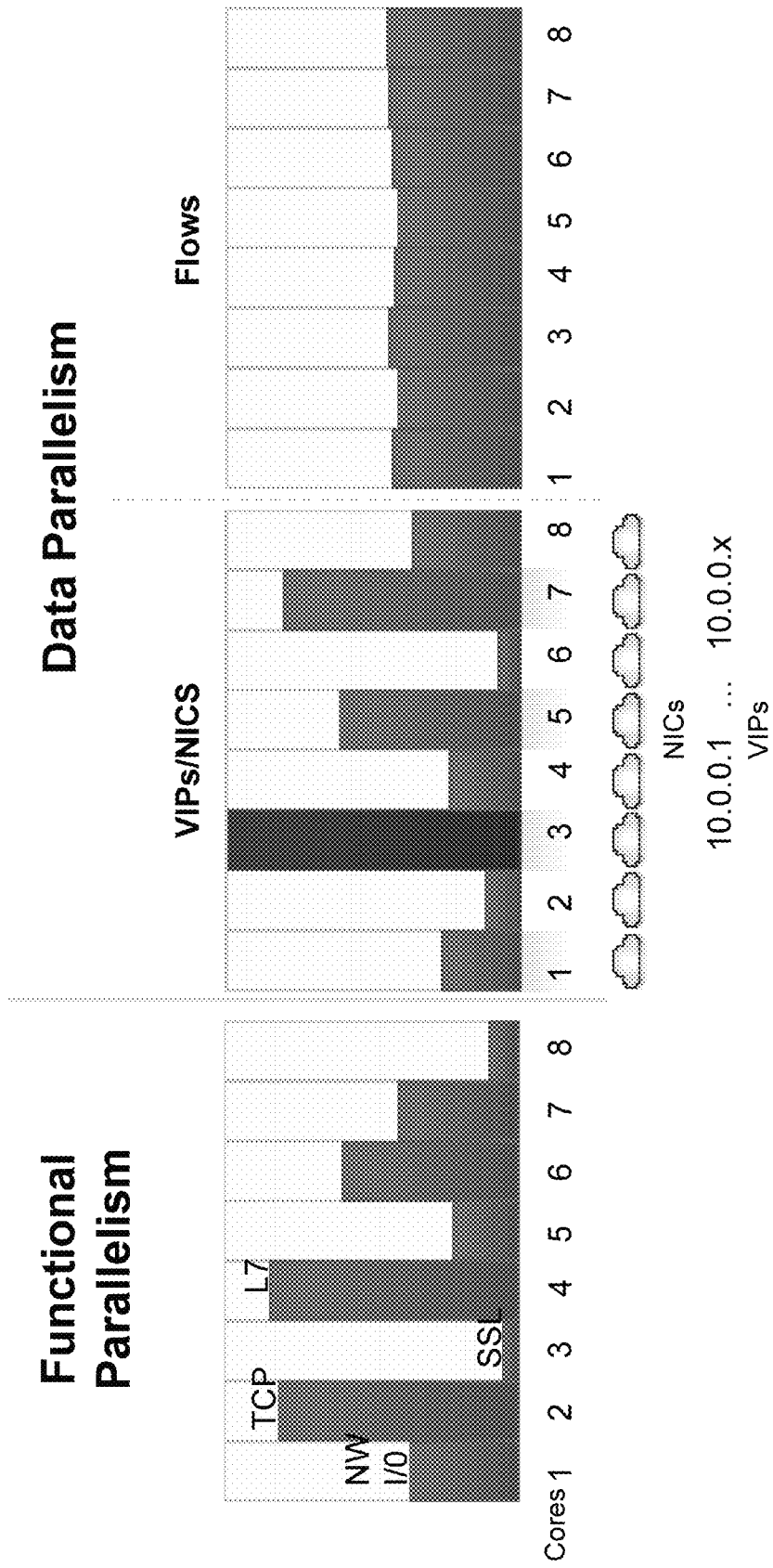
FIG. 3 is a block diagram depicting approaches to parallelism for embodiments of a multi-core network appliance.

Referring now to FIG. 3, an embodiment of approaches to an implementation of an architecture is depicted. In brief overview, there are multiple approaches to parallelism of leveraging multiple packet engines in a multiple core system.

FIG. 3 illustrates an appliance 200' with a total of eight cores numbers 1 through 8. There may be multiple VIPs 275 running across these cores. For a functional parallelism approach, each core may run a different function of the functionalities provided by the packet engine or appliance 200. In a data parallelism approach, data may be paralleled or distributed across the cores based on the Network Interface Card (NIC) or VIP 275 receiving the data. In another data parallelism approach, data processing may be distributed across the cores by distributing data flows to each core.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 3, division by function may lead to different cores running at different levels of performance.

In the case of a data parallelism approach, the work may be divided up and distributed based on VIPs, NICs and/or data flows. In one of these approaches, the work of the appliance may be divided or distributed among the VIPs. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple cores. While distributing work across cores based on VIPs or NICs may have a level of independency, as illustrated in FIG. 3, in some embodiments, this may lead to unbalanced use of cores.

In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached.

Figure 4A:
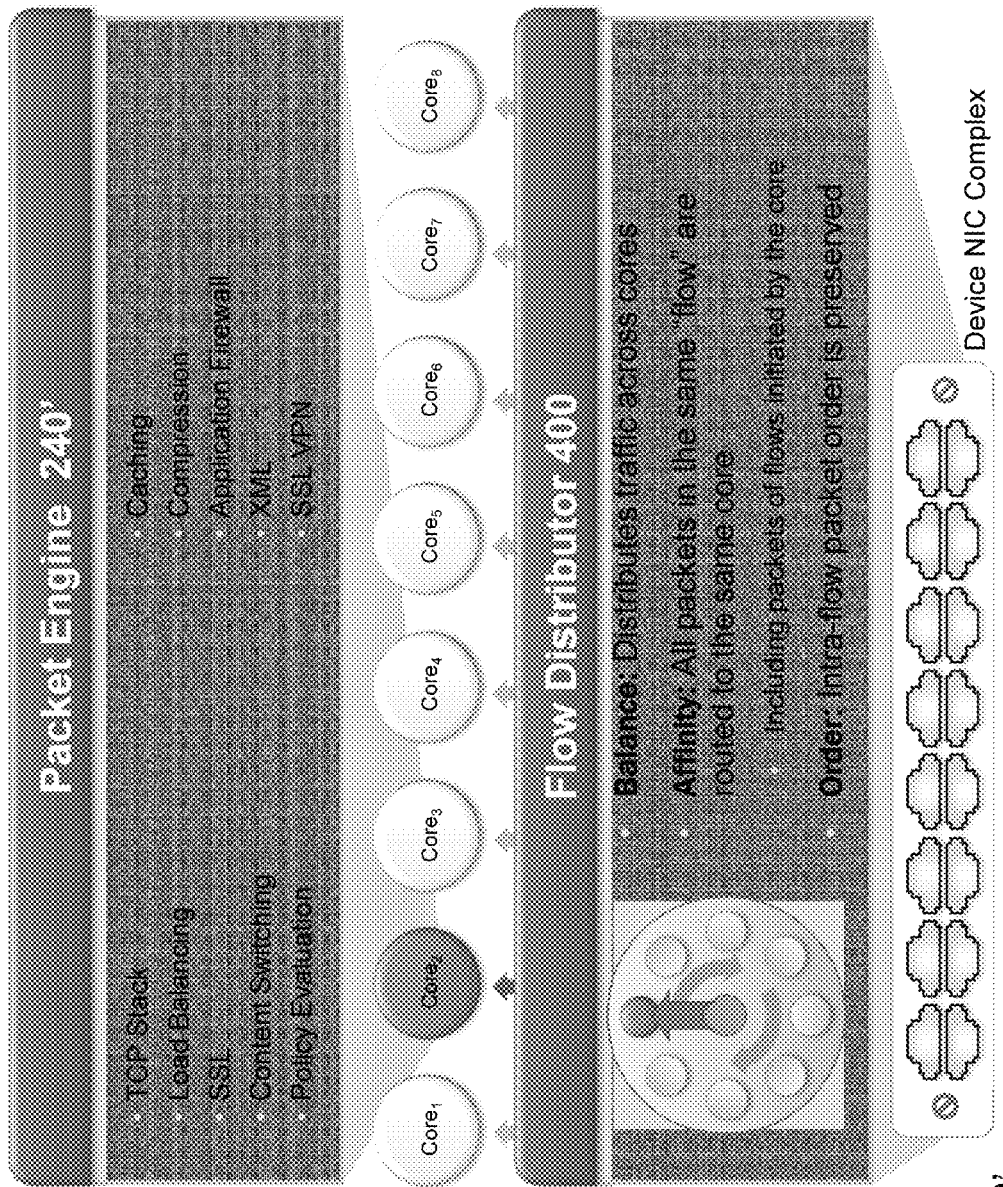
FIG. 4A is a block diagram of an embodiment of a multi-core network appliance.
Figure 4B:
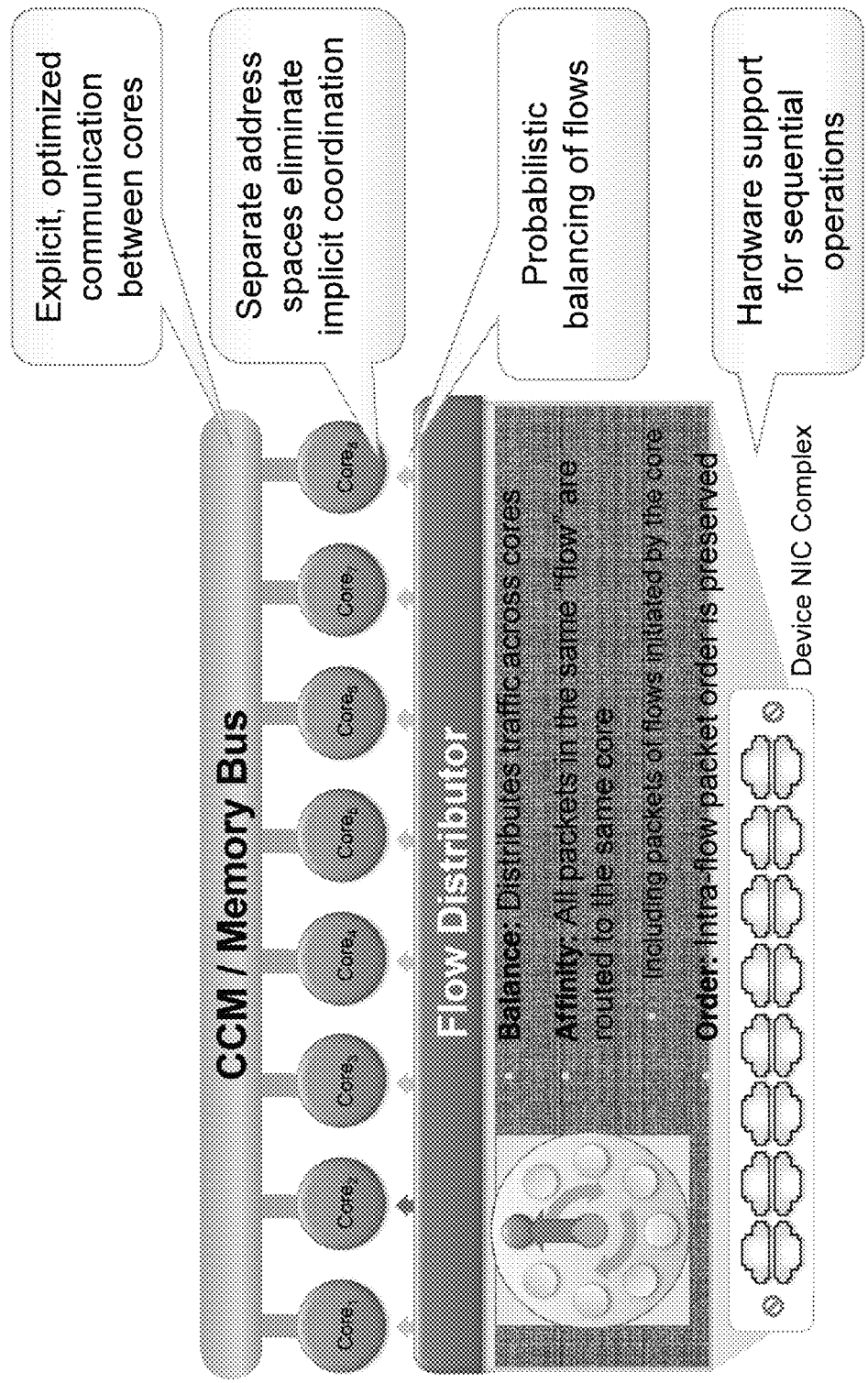
FIG. 4B is a block diagram of another embodiment of a multi-core network appliance.
Figure 4C:
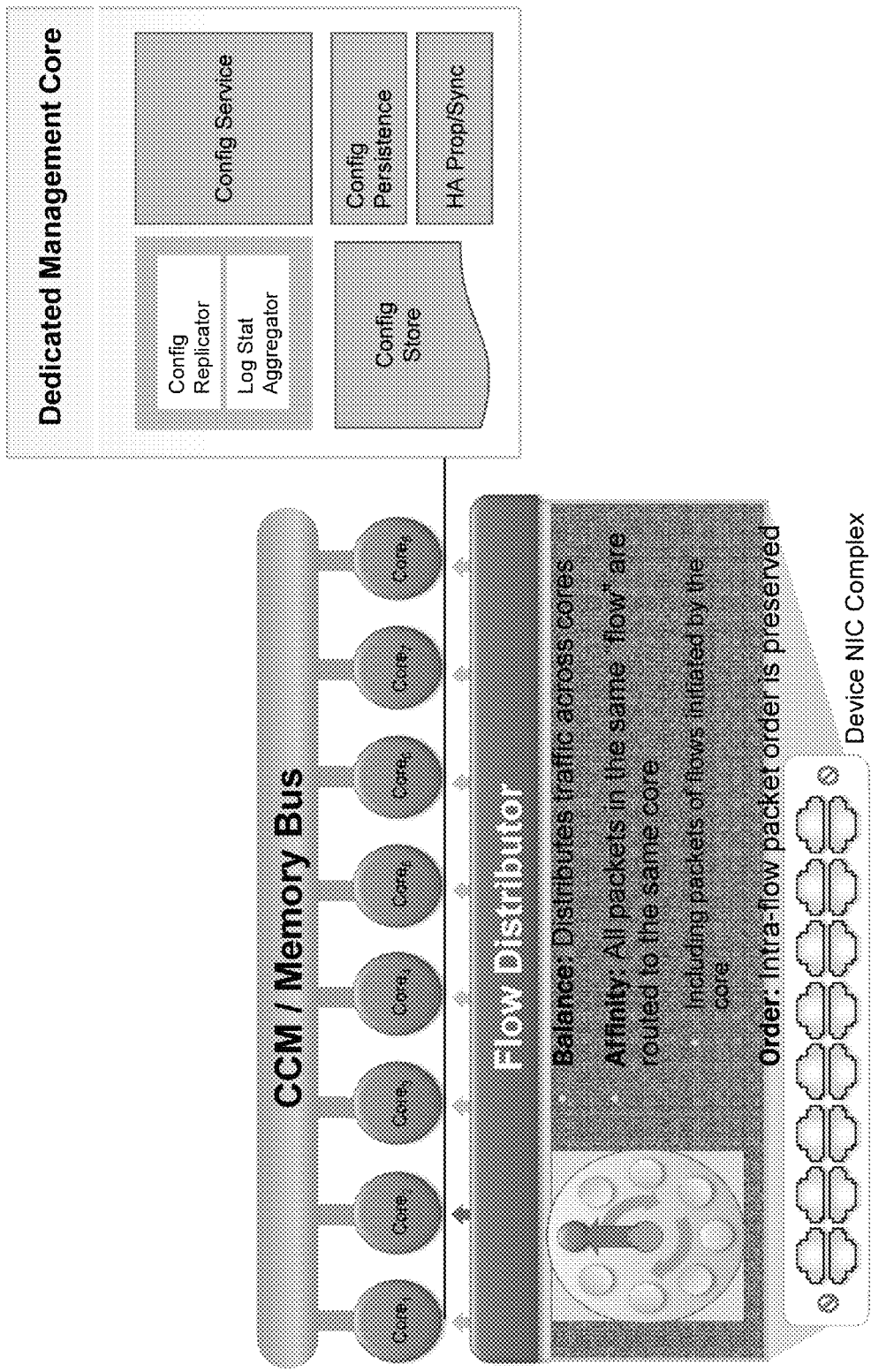
FIG. 4C is a block diagram of another embodiment of a multi-core network appliance.

Referring now to FIGS. 4A-4C, embodiments of a multi-core system running a plurality of packet engines is depicted. In brief overview of FIG. 4A, a packet engine may operate on each of the plurality of cores, such as cores 1 thru 8 of a multi-core appliance 200'. A flow distributor may distribute the network traffic across cores in accordance with any of the parallelism (data or functional) described above. As illustrated in FIG. 4A, an embodiment of the flow distributor distributes network traffic across cores based on a data flow approach. The flow distributor provides an affinity of packets of the same data flow to the same core. For example, the flow distributor routes packets of data flows initiated by a care to that core. The flow distributor maintains the order of intra-flow packets routed to a core.

The packet engine 240' may comprise any or all portions of the appliance described in connection with FIGS. 2A and 2B. In some embodiments, the packet engine 240' includes the packet engine 240 of FIG. 2A and may include any one or more of the following, in any combination, from FIG. 2A: network stack 267, cache manager 232, policy engine 236, compression engine 238, encryption engine 234, GUI 210, CLI 212, shell services 214 and monitoring programs 216. The packet engine 240 may comprise any one or more vServers 275A-275N. The packet engine 240' may include any one or more of the functionalities, in any combination, of SSL VPN 280, Intranet UP 282, Switching 284, DNS 286, Acceleration 288, App FW 280 and monitoring agent 197 described in connection with FIG. 2B. As such, the packet engine 240' may provide any of the following functionalities illustrated in FIG. 4A: a TCP stack, load balancing, SSL offloading and processing, content switching, policy evaluation, caching, compression, application firewall, XML processing and acceleration and SSL VPN connectivity.

The flow distributor 400 may comprise any combination of software and hardware to distribute, route, control and/or manage which cores process which network packets. The flow distributor may comprise any form of executable instructions, such as an application, program, library, process, service, task or script. The flow distributor may run on one core, some cores or all the cores. In some embodiments, the flow distributor runs on a first core of the plurality of cores. For example, one of the cores may be designed a control or master core and the flow distributor operates on this core. In other embodiments, the flow distributor runs on each of the cores. In some of these embodiments, the flow distributors may communicate or interface to each other to distribute network packets.

The flow distributor may interface to or communicate with the Receive-Side Scaling (RSS) network technology and/or driver. Receive-side scaling (RSS) is a network driver technology that enables the distribution of network receive processing across multiple CPUs in multiprocessor systems or multiple cores in multiple-core systems. In some embodiments, the flow distributor runs on hardware with the receive-side scaler (RSS) or as part of the RSS. The flow distributor may reroute the network traffic distributed by the RSS to different cores based on any of the functional or data flow parallelism approaches identified herein. For example, based on the RSS algorithms, the RSS may distribute one or more network packets to a first core which should be distributed to a second core based on data flow parallelism. The flow distributor may receive the distribution of the network packet from the RSS for the first core and distribute the network packet to the second core which is assigned the data flow.

Referring now to FIG. 4B, an embodiment of implementation of a multi-core architecture is depicted. In brief overview, the multiple cores of a multi-core system may communicate or interface via any type and form of bus, such as a memory bus. Any of the cores may communicate with another core by sending and receiving messages via the bus. Each of the cores may have separate address spaces or may share portions of an address space. The flow distributor may use any type and form of statistical or probabilistic algorithms or decision making to balance the flows across the cores. The hardware of the appliance may be designed and constructed to support sequential operations across the NICs and/or cores.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

A core may communicate with another core using any type and form of interprocess communication or mechanism. In one embodiment, the cores communicate using messages communicated over the bus connecting the cores. This may be referred to as Core to Core Messaging (CCM). In some embodiments, the core may communicate using shared memory. In some embodiments, the cores may use queues to store and retrieve messages to other cores. In other embodiments, the cores may communicate using an API to interface to an address space, object, data structure or other memory location of another core.

Referring now to FIG. 4C, another embodiment of an environment of a multi-core system is depicted. In brief overview, one core of the plurality of cores of the multi-core system may be a designated management core. In this example of FIG. 4C, a core is designated as the management core. The management core may include a configuration service, a configuration storage and a configuration persistence module. The management core may include a configuration replicator and a statistical log aggregator. The management core may also include a High Availability (HA) propagation and synchronization module.

Any one of the cores may be designated or configured to be the management core. This designated core may be considered a primary, master or configuration core. In some embodiments, the first core is the management core. In other embodiments, via configuration of the appliance 200' any core may be the management core. In some embodiments, multiple cores may be considered the management core. In some embodiments, one core is the management core and another core is a backup or failover management core. Any of the user interfaces (e.g., GUI, CLI of FIG. 2A) and configuration tools may be operated on and run by the management core.

The configuration service may comprise any type and form of executable instructions and interface for configuring any of the cores. The configuration service may provide an interface for specifying the type of parallelism to use. The configuration service may provide an interface for specifying a unit of network traffic to consider a data flow for distributing data flows to cores. The configuration service may provide an interface for specifying or configuring the number of cores. The configuration service may provide an interface for specifying a type of packet engine to run on each of the cores. The configuration service may provide an interface for configuring each of the packet engines to run on each of the cores. The configuration service may provide an interface for identifying or configuring the functionality for each of the packet engines to run on each of the cores. The configuration service may provide an interface for configuring the flow distributor, such as specifying or configuring distribution algorithms. The configuration service may provide an interface for configuring or specifying any policies for directing, controlling or managing the operation of the appliance 200' or any cores thereof.

The configuration service may store any configuration data or information into a configuration storage. The configuration storage may include any type and form of storage and/or memory, such as those described in connection with FIGS. 1E and 1F. The configuration for each core may be stored separately or together in the configuration storage. There may be a portion of the configuration applicable to all cores, such as a global or general configuration, and a portion of the configuration applicable specific to any one core or a predetermined cored, such as specific core configuration. The configuration may be stored in any type of format. The configuration may be stored to a database. The configuration data, such as via a file, may be uploaded to another device via a network or downloaded from another device to the appliance.

The configuration replicator may comprise any type and form of executable instructions for replicating the configuration or any portion thereof to one or more cores. The configuration replicator may replicate configuration stored in the configuration storage or otherwise stored in memory of the configuration service. In some embodiments, the configuration replicator replicates a configuration to each core by executing one or more command line or command scripts to each packet engine. In other embodiments, the configuration replicator replicates a configuration to each core by executing one or more API calls to each packet engine. In other embodiments, the configuration replicator obtains a current configuration of each core by executing API calls or command line commands. The configuration replicator may compare the current configuration of the core to a desired, stored or updated configuration. The configuration replicator may generate and execute a set of configuration commands representing a difference between the configurations and/or to update the current configuration of the core.

The configuration persistence service or module may comprise any type and form of executable instructions to persist the configuration in the configuration storage and/or across cores and/or appliances. The configuration persistence may make sure that any core has a current desired configuration. The configuration persistence may also provide updates to the configuration that may be communicated to external devices, such as another appliance. For example, in the case of high availability a second appliance may be updated with configuration changes from the configuration persistence service. This will keep the backup or secondary appliance with a configuration that is persistent across appliances and/or cores.

The HA Propagation and synchronization module may comprise any type and form of executable instructions for propagating and synchronization configuration and operational data to one or more other appliances 200'. The HA propagation and synchronization module may propagate and/or synchronize any SSL session and/or TCP connection information, such as state and other information to another appliance, for example, to enable that appliance re-establish or regenerate these sessions and/or connections. The HA propagation and synchronization module may propagate and/or synchronize any configuration, or portions therefore to another appliance.

The log stat aggregator may comprise any type and form of executable instructions for aggregating any logged operational and/or performance information and data from each of the cores. The log stat aggregator may combine the operational and/or performance information and data from each of the cores to present a system view of the operations and/or performance of the appliance 200'. The log stat aggregator may use any type and form of interface for receiving and/or obtaining the logs from each of the cores. In some embodiments, the log stat aggregator interfaces with each of the cores via a shared memory interface. In some embodiments, the log stat aggregator interfaces with each of the cores via messaging, such as core to core messaging. In some embodiments, the log stat aggregator interfaces with each of the cores via a queue. The log stat aggregator may receive or obtain a core's log on a predetermined schedule or frequency. The log stat aggregator may receive or obtain a core's log on demand, ad-hoc or as requested.

Figure 5A:
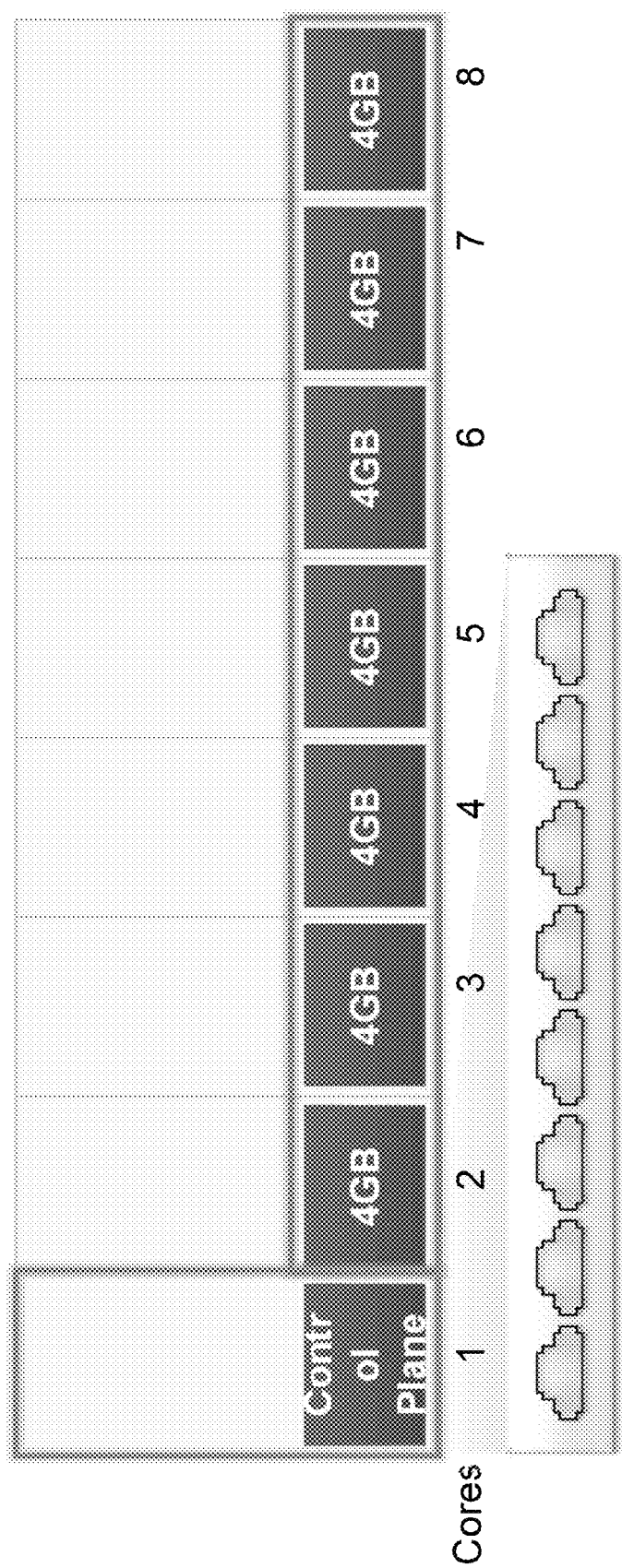
FIG. 5A is a block diagram of an embodiment of a control plane of a multi-core network appliance.
Figure 5B:
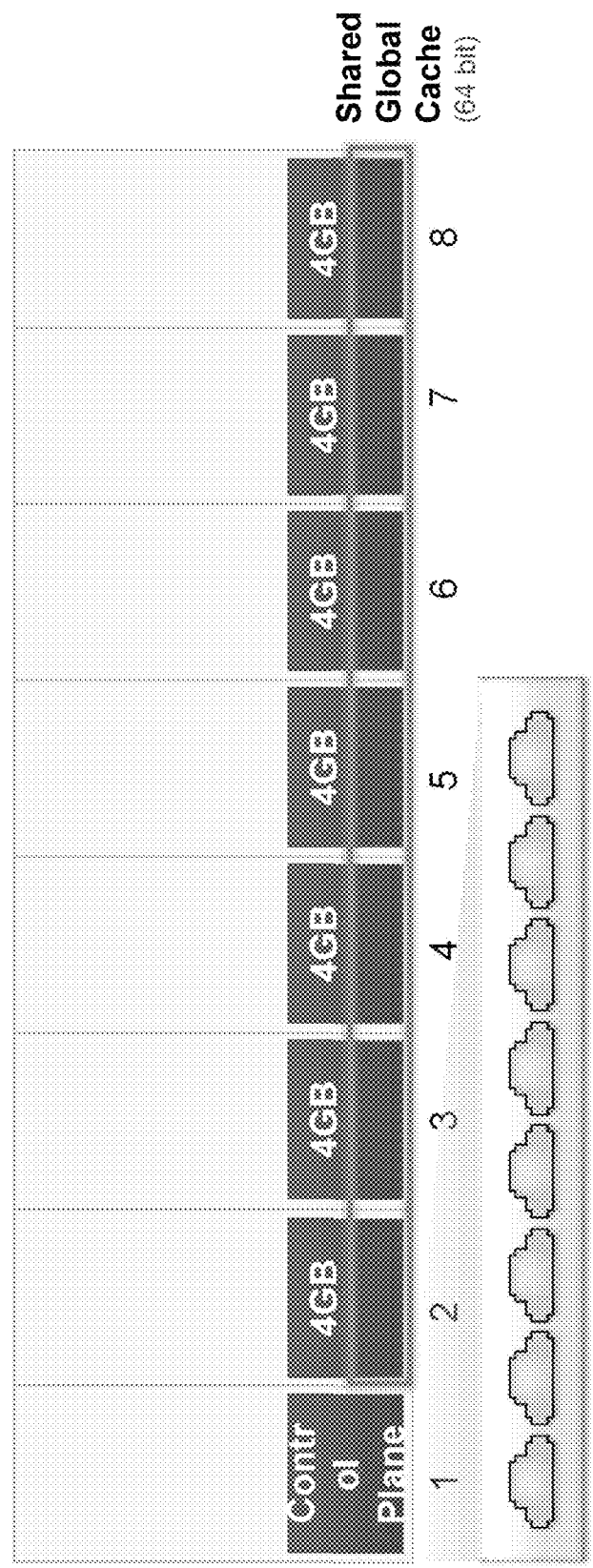
FIG. 5B is a block diagram of an embodiment of caching of a multi-core network appliance.

Referring now to FIGS. 5A and 5B, embodiments of an architecture of the multi-core system is depicted. FIGS. 5A and 5B illustrate the use of one core as a control plane for the multi-core system. In brief overview of FIG. 5A, a first core, such as core 1 may be configured or designated as providing control over the other cores. The multi-core system may have 32 GB of memory that may be allocated among the cores in any manner. FIG. 5A illustrates an embodiment in which each core gets 4 GB or an even allocation of the 32 GB memory. In other embodiments, each of the cores may be allocated a different size memory. For example, core 1 or other control plane core may be allocated a greater amount of memory, such as for dedicated management functionality of the multi-core system.

Referring to FIG. 5B, any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The control plane of the multi-core system of FIGS. 5A and 5B may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

Figure 6:
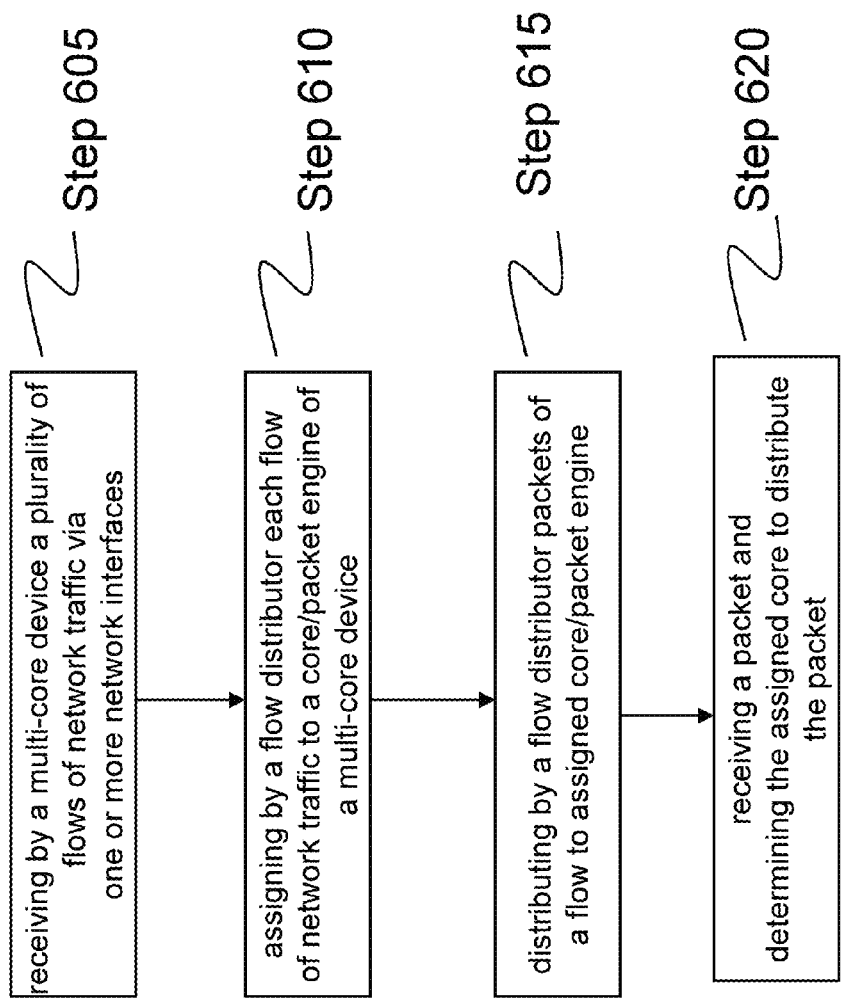
FIG. 6 is a flow diagram of an embodiment of a method for distributing network packets by a multi-core network appliance The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

Referring now to FIG. 6, embodiments of a method 600 for distributing network traffic across cores using a data flow scheme are depicted. In brief overview, at step 605, a multi-core device, such as appliance 400, receives different flows of network traffic between clients and servers. At step 610, a flow distributor of the multi-core device assigns each of the flows of network traffic to a core ad at step 615, the flow distributor distributes each network packet received for a corresponding flow to the core assigned to that flow of network traffic. At step 620, the flow receives a packet for a flow of network traffic and determines which core to distribute the packet.

In further details, at step 605, the multi-core device may receive network packets via any one or more types of network interfaces, such as a plurality of network interface cards of an appliance 200/400. The multi-core device may receive flows of network traffic identifies by any type of unit of network traffic. A flow of network traffic may be the network traffic communicated between two end points, such as a client and a server or between a front end component of an application and a back end component of an application. A flow of network traffic may be based on one or more application level transactions between the same endpoints. Any one or more packets for flows of network traffic may be received on the same or different network interface. For example, a first flow of network traffic may have network packets receives across a plurality of different network interfaces.

The multi-core device may have a receive-side scalar that distributes network packets based on an algorithm that is agnostic to the flow-based scheme desired by the flow distributor. The flow distributor may desire a data parallelism type scheme while the RSS may be using a hash bucket based Toefl algorithm that is on a packet by packet basis. As such, the RSS may distribute network packets from the same flow to any number of different cores. The flow distributor may operate in replace of, in conjunction with or in communication with an RSS.

In further details to step 610, the flow distributor may identify a flow of network traffic and assign the flow to a core or packet engine running on the core. The flow distributor may identify flows of network traffic based on tuple information or any combination or IP address and port information (source and/or destination) of the network packet. The flow distributor may identify flows of network traffic by using any application information stored in or carried by the content of the payload of the network packet. For example, the flow distributor may use any headers and/or fields of the application content to identify a flow for the network packet. The flow distributor may use any combination of packet header and fields from any plurality of protocol layers.

For each flow of network traffic, the flow distributor may assign each flow to a different core or a same core based on more or less an even distribution or load balancing of data flows across cores or packet engines running on cores. In some embodiments, the flow distributor assigns a flow of network traffic to the core which executes the packet processing engine which established a transport layer connection between the client and the server over which the packet is communicated. In some embodiments, the flow distributor assigns a flow of network traffic to the core which executes the packet processing engine which established an application session between the client and the server over which the packet is communicated. In some embodiments, the flow distributor assigns a flow of network traffic to the core which executes the packet processing engine which established an SSL session between the client and the server over which the packet is communicated. In some embodiments, the flow distributor identifies and assigns flows of network traffic to cores and/or packet engines based on request and response pairings. In some embodiments, the flow distributor identifies and assigns flows of network traffic based on a series of request and responses over the same connection or session or between the same end points.

At step 615, as network packets are received, the flow distributor distributes the network packet to the core assigned for the flow for that network packet. The flow distributor may receive intra-flow network packets, for example one packet of a first flow followed by another packet of a second flow. Each packet as received by the flow distributor is assigned to the core or packet engine assigned to process the network packets for that flow. In some embodiments, the flow distributor forwards the network packet to the core upon receipt by the flow distributor, for example, streams the network packet as a flow to each code. In some embodiments, the flow distributor batches a plurality of network packets of the same flow and forwards the batch to the assigned core. In some embodiments, the flow distributor batches a plurality of network packets from different flows that are assigned to the same core and forwards the batched network packets to the assigned core.

At step 620, in some embodiments, the flow distributor may redistribute packets to different cores than assigned or distributed via the RSS. For example, the flow distributor may receive a packet for one core assigned by the RSS and based on the flow-based scheme, reassigns or redistributes the packet to the core for which the other packets of the flow have been distributed to by the flow distributor. In some embodiments, the flow distributor intercepts the distribution of the packet by the RSS. In some embodiments, the flow distributor is the recipient of the distribution by the RSS. For example, the flow distributor may be inline with the RSS to core(s) communication path. In another example, the flow distributor may run on the core and receive the network packet distributed to that core by the RSS. In some embodiments, the flow distributor runs with or as part of the RSS. In some embodiments, a core, packet engine or flow distributor redirects a network packet received on one core to another core that has the flow (e.g., connection, session or associated transaction). For example, a receiving core or packet engine may not have any context for the flow and redirects, forwards or send the network packet to the appropriate core or packet engine handling that flow of network traffic.

The invention claimed is:

1. A method for distributing flows of network traffic across cores of a device having multiple cores, the method comprising:
    (a) receiving, by a flow distributor of a device having a plurality of cores deployed intermediary between a plurality of clients and a server, a first packet distributed by a receive-side scaler of the device to a first core of the plurality of cores;
    (b) identifying, by the flow distributor, a first flow of network traffic from the plurality of different flows of network traffic between a plurality of clients and a server to which the first packet belongs, based on tuple information of the first packet; and
    (c) redistributing, by the flow distributor, the first packet from the first core to a second core of the plurality of cores, responsive to the identification of the first flow and a determination that the second core established a transport layer connection between a client of the plurality of clients and the server for the first flow.

2. The method of claim 1, wherein the step (c) further comprises:
    identifying the second core that established the transport layer connection between the client and the server for the first flow, and selecting the identified core as a distribution target for each packet of the first flow.

3. The method of claim 1, wherein the step (a) further comprises intercepting, by the flow distributor, packets distributed by the receive side scaler.

4. The method of claim 1, wherein step (a) further comprises executing, by the device, the flow distributor on one or more cores of the multi-core device.

5. The method of claim 1, wherein the flow distributor operates in conjunction with the receive-side scaler.

6. The method of claim 1, wherein step (b) further comprises identifying, by the flow distributor, the first flow based on application information carried in a payload of the first packet.

7. The method of claim 1, further comprising balancing, by the flow distributor, assignment of the plurality of different flows across the plurality of cores.

8. The method of claim 1, further comprising:
receiving, by the flow distributor, a second packet distributed by the receive-side scaler to a third core;
identifying that the second packet belongs to the first flow; and
redistributing, by the flow distributor, the second packet from the third core to the second core.

9. The method of claim 1, wherein each flow comprises network traffic between two end points of a transport layer connection that traverses the device.

10. The method of claim 1, wherein each flow comprises an application layer transaction over a transport layer connection that traverses the device.

11. A system for distributing flows of network traffic across cores of a device having multiple cores, the system comprising:
a device deployed intermediary to a plurality of clients and a server, comprising a plurality of cores, a flow distributor, and a receive-side scaler, wherein a flow distributor of the device is configured to:
receive a first packet distributed by a receive-side scaler of the device to a first core of the plurality of cores,
identify a first flow of network traffic from the plurality of different flows of network traffic between a plurality of clients and a server to which the first packet belongs, based on tuple information of the first packet; and
redistribute the first packet from the first core to a second core of the plurality of cores, responsive to the identification of the first flow and a determination that the second core established a transport layer connection between a client of the plurality of clients and the server for the first flow.

12. The system of claim 11, wherein the flow distributor is further configured to:
identify the second core that established the transport layer connection between the client and the server for the first flow, and
select the identified core as a distribution target for each packet of the first flow.

13. The system of claim 11, wherein the flow distributor is further configured to intercept packets distributed by the receive side scaler.

14. The system of claim 11, wherein the device is further configured to execute the flow distributor on one or more cores of the multi-core device.

15. The system of claim 11, wherein the flow distributor is further configured to operate in conjunction with the receive-side scaler.

16. The system of claim 11, wherein the flow distributor is further configured to identify the first flow based on application information carried in a payload of the first packet.

17. The system of claim 11, wherein the flow distributor is further configured to balance assignment of the plurality of different flows across the plurality of cores.

18. The system of claim 11, wherein the flow distributor is further configured to:
receive a second packet distributed by the receive-side scaler to a third core;
identify that the second packet belongs to the first flow; and
redistribute the second packet from the third core to the second core.

19. The system of claim 11, wherein each flow comprises network traffic between two end points of a transport layer connection that traverses the device.

20. The system of claim 11, wherein each flow comprises an application layer transaction over a transport layer connection that traverses the device.

* * * * *